United States Patent [19]

Flint et al.

[11] 4,121,138

[45] Oct. 17, 1978

[54] SERVO SYSTEM

[75] Inventors: John R. Flint, Barrington; Rolf B. Erikson, Lincolnwood; George Rabindran, Morton Grove, all of Ill.

[73] Assignee: Bell & Howell Company, Chicago, Ill.

[21] Appl. No.: 801,703

[22] Filed: May 31, 1977

[51] Int. Cl.² ............................................. B65H 77/00
[52] U.S. Cl. ......................................... 318/7; 318/59; 318/72
[58] Field of Search ............................... 318/72, 7, 59

[56] References Cited

U.S. PATENT DOCUMENTS

| 2,875,388 | 2/1959 | Scheu | 318/72 X |
| 3,704,401 | 11/1972 | Miller | 318/72 X |
| 3,715,641 | 2/1973 | Mattes | 318/7 |
| 4,051,415 | 9/1977 | Martin | 318/72 X |

*Primary Examiner*—B. Dobeck
*Attorney, Agent, or Firm*—Harry G. Thibault; Alan B. Samlan

[57] ABSTRACT

A system is described for controlling the speed and direction of rotation of first and second spools in a web transport system in which a web is advanced between the spools by first and second drive motors. The system incorporates a servo control which continuously reacts to variations in the speed of the spools so as to drive the spools at respective speeds whose sum is constant and proportional to a selectable control voltage. To achieve this result, the first and second spools, driven, respectively by the first and second drive motors, are coupled to means, such as a corresponding pair of servo generators, for generating electrical outputs representative of the direction and speed of rotation of the spools. A control voltage, proportional to the sum of the desired speeds of the two spools, is continuously and algebraically summed with the outputs of the two servo generators, the summed signal constituting a motor drive signal. A motor drive control receives the motor drive signal and selectively applies it to the drive motor associated with the spool upon which the web is to be wound. The pull thus exerted on the web by the actively driven spool rotates the other spool, both spools thereby rotating their corresponding servo generators. The motor drive signal, derived from the control voltage and the outputs of the servo generators, continuously reflects the changing outputs of the servo generators so as to cause the spools to rotate at respective speeds whose sum is constant and proportional to the control voltage.

4 Claims, 4 Drawing Figures

SERVO SYSTEM

BACKGROUND OF THE INVENTION

This invention relates generally to web transport systems and is particularly directed to a speed control for web transport systems wherein a web is advanced between a pair of rotating spools.

Microfilm readers, tape recording and playback devices and the like typically include a web transport system for advancing a continuous web between a take-up spool and a supply spool. In microfilm readers, the web is in the form of an elongated strip of microfilm, whereas in tape recording and playback devices the web is an audio or video tape. Regardless of the form which the web takes, it is a requirement of most such systems that the web be able to be transported between a take-up spool and a supply spool quickly. During such transport, it is desirable that no slack be permitted to develop in the web to ensure that the web is wound tightly on the take-up spool and no excess loops of web are formed on the supply spool.

To achieve the desired results, prior web transport systems which use a pair of drive motors, one for each spool, have included a servo control system for controlling the speed and the torque of the drive motors in order to control the tension in the web. Such control over the drive motors has been achieved by coupling each drive motor to a servo generator and using the output of the generator associated with the take-up spool to control the speed of the motors. However, when the take-up spool is rotating at low speeds, the output of its associated servo generator has a correspondingly low amplitudes, thereby making it difficult to achieve good resolution in the servo control system.

An additional difficulty associated with such prior systems derives from the fact that the speed of the web varies considerably as it is transported from the supply spool to the take-up spool. For example, if it is desired to completely transport the film from the supply spool to the take-up spool in a predetermined transport time, the initial transport of film occurs at a slow rate because of the small effective diameter of the hub on the take-up spool. As the level of web increases on the take-up spool, its effective hub diameter increases. As a result, and if the take-up spool is being rotated at a constant speed, the speed with which the web is transported increases continuously. Consequently, 70 to 80% of the transport time is devoted to advancing half the length of the web. The remainder of the web must, therefore, be transported in only 20 to 30% of the allotted transport time. During the transport of the remaining half of the web, the web is advanced at a very high speed and the supply spool rotates at a correspondingly high speed.

Several undesirable results are obtained from such operation. Firstly, it becomes very difficult to locate a portion of the web which is being transported at a very high speed during the last 20 to 30% of the transport time. This is particularly undesirable in microfilm readers. Secondly, the high speed of rotation of the supply spool, as well as the high speed of transport of the last half of the web, poses a potential safety hazard because the edges of the web and the edges of the supply spool may inflict injury to an operator who comes in contact with them. In addition, high speed rotation of the supply spool frequently results in a great amount of wear on the rotating elements and an undesirably short life span for those elements. These and other problems associated with prior web transport systems have rendered them unsuitable in some environments.

Accordingly, it is an object of this invention to provide an improved speed control for a web transport system.

It is a more specific object of this invention to provide a control for a web transport system which causes the web to be transported between a supply spool and a take-up spool at a relatively low maximum speed but within the same transport time allocated for prior systems.

It is a further object of the invention to provide a control for a web transport system which causes the first and second half of the web to be transported between spools in substantially equal time intervals.

BRIEF DESCRIPTION OF THE DRAWINGS

These and other objects and advantages of the invention are more particularly set forth in the following detailed description and in the accompanying drawings of which.

DESCRIPTION OF THE PREFERRED EMBODIMENT

Broadly stated, the invention described herein is a control system for a transport device in which a servo control continuously reacts to variations in the speed of a pair of spools so as to drive the spools at respective speeds whose sum is constant and proportional to a selectable control voltage. To achieve this result, the spools which are driven by a pair of drive motors are coupled to means, such as a corresponding pair of servo generators, for generating electrical outputs which are representative of the direction and speed of rotation of the spools. A control voltage, proportional to the sum of the desired speeds of the two spools is generated and continuously and algebraically summed with the outputs of both servo generators, the summed signal constituting a motor drive signal. A motor drive control receives the motor drive signal and selectively applies it to the drive motor associated with the spool upon which the web is to be wound, i.e., the take-up spool. The pull thus exerted on the web by the take-up spool rotates the other spool, i.e., the supply spool.

As a result of this arrangement, the outputs of the first and second servo generators increase and decrease in response to corresponding increases and decreases in the speed of the take-up and supply spools. Further, the motor drive signal continuously reflects the changing outputs of the servo generators so as to cause the spools to rotate at respective speeds whose sum is constant and proportional to the control voltage.

In addition, the control system includes means for braking the system when substantially all of the web has been transported from the supply spool to the take-up spool. Other novel and advantageous aspects of the transport system are described below.

Figure 1:
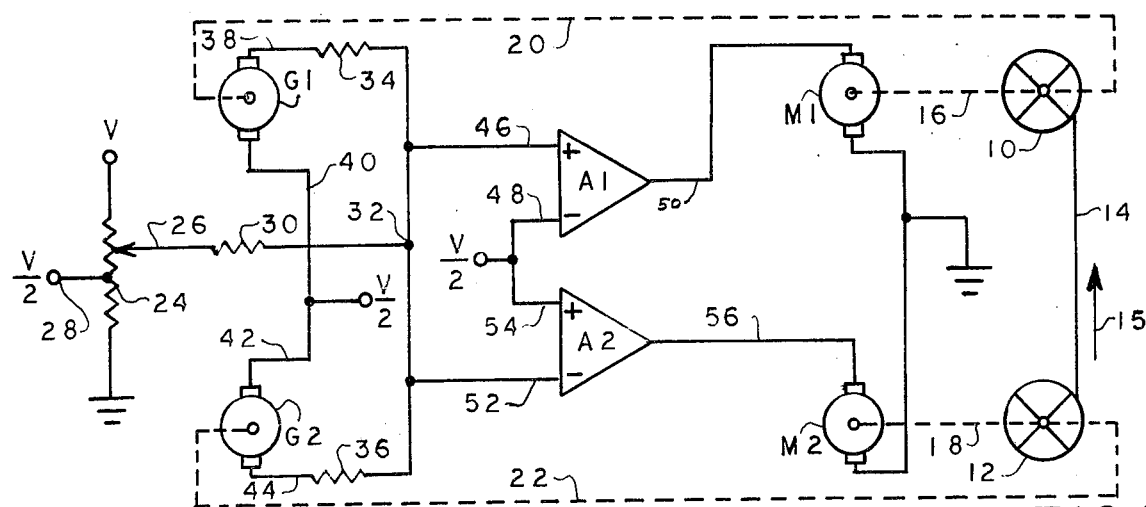
FIG. 1 is a schematic illustration of a web transport control embodying various aspects of the invention.

Referring now to FIG. 1, there is shown a schematic illustration of a control for a web transport device embodying several aspects of the invention. As shown, the transport device includes a pair of rotatable spools 10 and 12 between which a web 14 such as microfilm is threaded. Each of the spools 10 and 12 is adapted to function alternately as a take-up spool and a supply spool. For example, when the web 14 is being transported in the direction of the arrow 15, the spool 10 is acting as a take-up spool while the spool 12 is acting as a supply spool. When the web 14 is being transported in the reverse direction, the spool 12 acts as a take-up spool and the spool 10 acts as a supply spool.

To rotate the spool 10, a shaft, indicated schematically by the dashed line 16, couples the spool 10 to a first drive motor M1. The spool 12 is similarly coupled by a rotatable shaft, indicated schematically by the line 18, to a second drive motor M2. Each of the drive motors M1 and M2 are preferably DC motors whose speed and direction of rotation is dependent upon the magnitude and polarity, respectively, of the voltage applied to the motors.

To control the rotation of the motors M1 and M2 and their associated spools, the motors are included in a servo control loop which, as will be presently described, rotates the spools 10 and 12 such that their combined speeds are always constant.

In order to generate an electrical signal indicative of the direction and speed of rotation of the spools 10 and 12, there is provided a first servo generator F1 and a second servo generator G2. The servo generator G1 is mechanically coupled to the spool 10 by means of a shaft or linkage, as indicated schematically by the dashed line 20. Likewise, the servo generator G2 is coupled to the spool 12 by means of another shaft or linkage, as indicated schematically by the dashed line 22. Thus, as the spools 10 and 12 rotate, their corresponding servo generators G1 and G2 develop output signals which are representative of the direction and speed of rotation of their corresponding spools.

As in conventional servo system systems, the embodiment shown in FIG. 1 develops a control voltage which is selectably variable for varying the rotational speed of the motors M1 and M2. In the embodiment shown in FIG. 1, the control voltage is developed from a resistor 24 coupled between a supply voltage V and ground. The resistor 24 includes a wiper arm 26 at which the control voltage is present. The resistor 24 further includes a fixed terminal 28 at which one-half the supply voltage V is always present. The significance of the voltage at the terminal 28 will be apparent in light of the discussion below.

The control voltage present on the wiper arm 26 is coupled via a resistor 30 to a common connection 32 to which a pair of resistors 34 and 36, of substantially equal value, are also connected.

The servo generator G1 includes an output terminal 38 and a reference terminal 40, the latter of which is coupled to one-half the supply voltage V. As a result of this connection, the voltage present on the output terminal 38 will always be either positive or negative with respect to the voltage at its terminal 40, depending on its direction of rotation.

Similarly, the servo generator G2 has a reference terminal 42 which is coupled to one-half the supply voltage V and a terminal 44 which couples the resistor 36 to the output of the servo generator G2. Thus, the voltage at the terminal 44 will always be positive or negative with respect to the voltage at the terminal 42, depending on the direction of rotation of the servo generator G2.

The resultant voltage at the common connection 32 is an algebraic sum of the outputs of the generators G1 and G2 and the control voltage on the wiper arm 26. Accordingly, the motor drive control at the common connection 32 will reflect any changes in the amplitude of the outputs of the generators G1 and G2 and is, therefore, sensitive to the speeds of rotation of both spools 10 and 12. This arrangement differs from prior servo systems where the motor drive signal is sensitive only to the outputs of one servo generator at a time, specifically the servo generator associated with the motor which is activated.

Greater resolution of the servo system is affected by the present system by virtue of both generators G1 and G2 constantly supplying to the common connection 32 signals which are representative of the direction and speed of rotation of both spools, even when only one of the spools is being actively driven. For example, assuming that the spool 10 is acting as a take-up spool and is being actively driven by the motor M1, and the spool 12 is acting as a supply spool and is rotating only in response to the pull exerted thereon by the web 14, the motor drive signal at the connection 32 is yet responsive to the speeds of rotation of both spools 10 and 12 by virture of the continuous and algebraic summing of the outputs of the generators G1 and G2.

The motor drive signal present at the common connection 32 is fed to a pair of amplifiers A1 and A2 for driving the motors M1 and M2. To insure that only the appropriate motor is driven by the motor drive signal, the amplifiers A1 and A2 compare the motor drive signal to one-half the supply voltage V for driving the motor M1 when the motor drive signal is positive with respect to one-half the supply voltage V and for driving the motor M2 when the motor drive signal is negative with respect to one-half the supply voltage V. Hereinafter, the voltage corresponding to one-half the supply voltage V is referred to as the reference voltage.

Referring to the amplifier A1, it has a pair of input terminals 46 and 48, the terminal 46 being connected to the common connection 32 upon which the motor drive signal is present and the terminal 48 being connected to the reference voltage. Thus, whenever the motor drive signal at its input terminal 46 is positive with respect to the reference voltage, the amplifier A1 amplifies the motor drive signal and applies it to the motor M1 via an output lead 50. When the motor drive signal on its input lead 46 is negative with respect to the reference voltage, the amplifier A1 is off and the motor M1 is deactivated. Thus, the amplifier A1 acts both as a comparator and as an amplifier.

Referring to amplifier A2, it also has a pair of input terminals 52 and 54, the terminal 52 being coupled to the common connection 32 at which the motor drive signal is present and the input terminal 54 being coupled to the reference voltage. When the motor drive signal at terminal 52 is negative with respect to the reference voltage, the amplifier A2 will amplify the motor drive signal and apply it to the motor M2 via an output lead 56. Conversely, when the motor drive signal at input terminal 52 is positive with respect to the reference voltage, the amplifier A2 is off and the motor M2 is deactivated.

The over-all operation of the system shown in FIG. 1 may best be described by first assuming that the wiper arm 26 is positioned precisely opposite the terminal 28 on the resistor 24 such that the control voltage on the wiper arm 26 is precisely equal to the reference voltage.

Under these conditions, the motors M1 and M2 are both deactivated. If the wiper arm is then moved upwardly to the position shown in FIG. 1, the control voltage on the wiper arm 26 will be positive with respect to the reference voltage, as will the motor drive signal at the common connection 32. As a result, the amplifier A1 will be turned on for activating the motor M1. The actuation of the motor M1 causes the spool 10 to rotate for winding up the web 14 on the spool 10, thereby also rotating the spool 12 by virtue of the pull thereon exerted by the web 14. The rotation of the spools 10 and 12 effects a corresponding rotation of the servo generators G1 and G2.

The rotation of the servo generators G1 and G2 results in their generation of output voltages at their terminals 38 and 44, respectively, which output voltages are both negative with respect to the reference voltage. In response to the voltages developed by the generators G1 and G2, the motor drive signal present at the common connection 32 changes, as does the output of the amplifier A1 so as to drive the motor M1 toward its steady state condition at which the sum of the speeds of rotation of the spools 10 and 12 are constant and proportional to the control voltage on the wiper arm 26. Because the motor drive signal at the common connection 32 is now positive with respect to the reference voltage, the amplifier A2 remains off, thereby causing the motor M2 to be deactivated while the spool 10 is operating as a take-up spool.

Assuming now that the wiper arm 26 is moved abruptly downward so that the voltage thereon is exactly equal to the reference voltage, the net voltage at the output connection 32 will now be negative with respect to the reference voltage due to the output of the generators G1 and G2 which continue to rotate in their original direction. However, now the amplifier A1 is turned off, the amplifier A2 is turned on, and the motor M2 is driven to brake the system so as to terminate the rotation of the spools 10 and 12.

If the wiper arm 26 is now moved downwardly on the resistor 24 so that the control voltage on the wiper arm 26 is negative with respect to the reference voltage, the voltage appearing at the common connection 32 will now be negative so as to keep the amplifier A2 on for rotation of the motor M2 and the spool 12 such that the spool 12 now rotates in a direction to wind the web 14 about itself. This reverse rotation of the spools 10 and 12 causes the outputs of the generators G1 and G2 to be positive with respect to the reference voltage, thereby changing the value of the voltage at the common connection 32 and changing the drive voltage which is supplied to the motor M2. This change in the value of the motor drive signal at the common connection 32 continues until the spools 10 and 12 arrive at a steady state speed of rotation.

Figure 2:
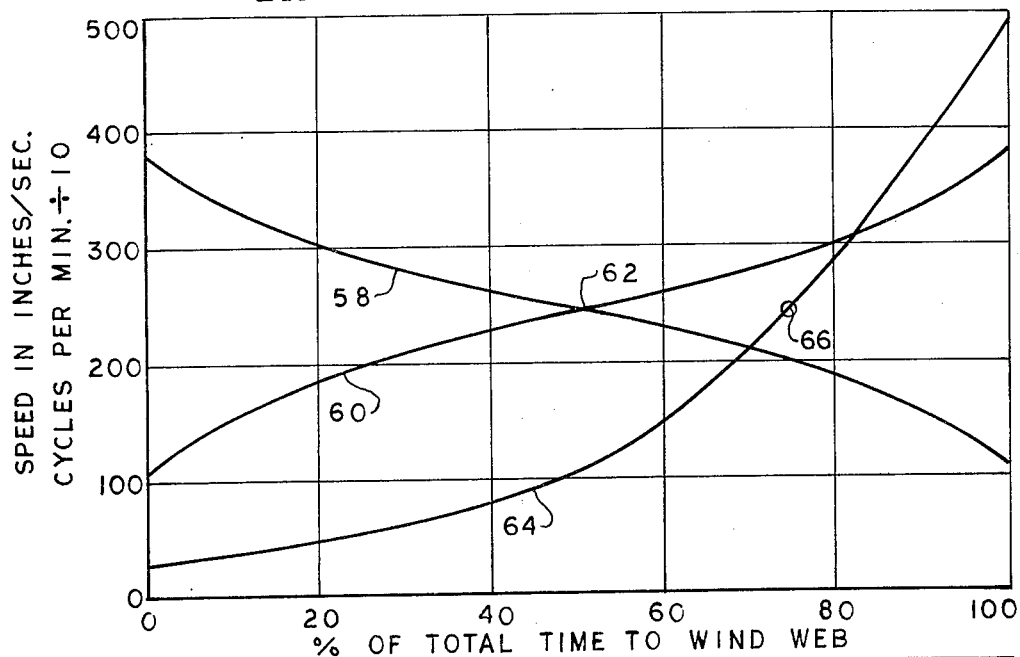
FIGS. 2 and 3 are graphs which are used to explain the operation and advantages of the system shown in FIG. 1.

The significance of the arrangement illustrated in FIG. 1 and the control exerted thereby over the rotational speeds of the spools 10 and 12 is best described with reference to FIG. 2 which is a plot of the speed of rotation of the spools versus the percentage of the total time required to wind the web completely about the take-up spool. Further, it is assumed that the wiper arm 26 has been adjusted such that the voltage thereon is selected to rotate the spools 10 and 12 at approximately 4700 revolutions per minute. Referring to FIG. 2, the curve 58 indicates the rotational speed of the take-up spool while the curve 60 represents the speed of the supply spool. Although the speed of each spool varies as the web is being accumulated on the take-up spool, it is evident from the figure that the sum of the speeds of the supply spool and the take-up spool remains constant. Shortly after actuation of the drive motor which is associated with the take-up spool, the take-up spool will acquire a rotational speed, as indicated by the curve 58, of approximately 3750 rpm. Simultaneously, the supply spool will be rotating at a speed indicated by the curve 60 of approximately 950 rpm. As the web is wound about the take-up spool, the rotational speed of the take-up spool decreases while the rotational speed of the supply spool increases. The speeds of rotation of the two spools continue to change until they are equal at the point 62, at which time 50% of the web will have been transported to the take-up spool. As the spools continue to rotate, their rotational speeds continually change but the sum of their speeds remains constant at approximately 4700 rpm. Just prior to the web being completely wound about the take-up spool, the take-up spool will be rotating at a speed of approximately 950 rpm while the supply spool will be rotating at a speed of approximately 3750 rpm.

Two significant and desirable effects are indicated in FIG. 2. Firstly, the time required to advance the first half of the web completely onto the take-up spool is equal to the time required to advance the second half of the web onto the take-up spool. Thus, with equal time intervals allocated for transporting each half of the web, the ease at which a particular portion of the web may be accurately stopped is substantially independent of its location on the web. This is contrary to prior systems wherein the second half of the web was transported to the take-up spool in a time roughly equivalent to one-third the time required for the transportation of the first half of the web. Thus, it has been difficult to precisely locate a particular portion of the web on the second half of the film as the web is being wound quickly about the take-up spool. As noted above, the operation of prior systems was particularly disadvantageous in microfilm readers wherein it is frequently desired to locate a particular portion of the film.

A second advantageous result produced by the present system is that the maximum speed of rotation of either of the spools is smaller than the maximum speed of rotation of the supply spool in a conventional system. This maintenance of a smaller maximum speed is effected while simultaneously moving the same amount of film within the same transport time.

For purposes of comparison, the curve 64 has been included to illustrate the performance of a conventional web transport system. Specifically, the curve 64 indicates the speed of rotation of the supply spool in a conventional system. As indicated in FIG. 2, the speed of the supply spool starts off at a relatively low speed but increases dramatically as the web is transported to the take-up spool. By the time the web has been substantially wound about the take-up spool, the rotational speed of the conventionally driven supply spool far exceeds the maximum speed of either spools in the present system. Further, the point 66 on the curve 64 indicates the point at which the first half of the web will have been advanced to the take-up spool. As is evident from the drawing, the time required for the transportation of the first half of the web from the supply spool to the take-up spool is between 70 and 80% of the total allocated transport time. The second half of the web must, therefore, be transported within a much shorter time duration. This latter aspect is, of course, undesirable for the reasons set forth above.

The fact that the supply and take-up spools of the present invention rotate at speeds whose sum is constant enables the web itself to be transported at a more constant speed than prior systems. This desirable result is shown graphically in FIG. 3 wherein the curves 58 and 60 are reproduced from FIG. 2 and the curve 68 indicates the velocity of the web as it is being transported from the supply spool to the take-up spool in the present system. The curve 70 indicates the speed of transportation of a web in a conventional web transport system. As is evident from the curve 68, the speed of transportation of the web in the present system is fairly constant over a relatively wide range. Moreover, the ratio of the slowest web speed to the highest web speed is only approximately 1.7 to 1. This is in contrast to the velocity of the web in the conventional system wherein the web velocity constantly increases and has a much greater maximum to minimum speed ratio. Because of the fact that the speed of web transportation is more nearly constant in the present system than in a conventional system, it is possible to more easily locate any particular portion of the web and stop the system when the desired portion has been located. This is particularly advantageous in systems where information on the web is being constantly read automatically and it is desired to maintain a relatively low ratio between the maximum and minimum speeds of transportation of the web.

Figure 3:
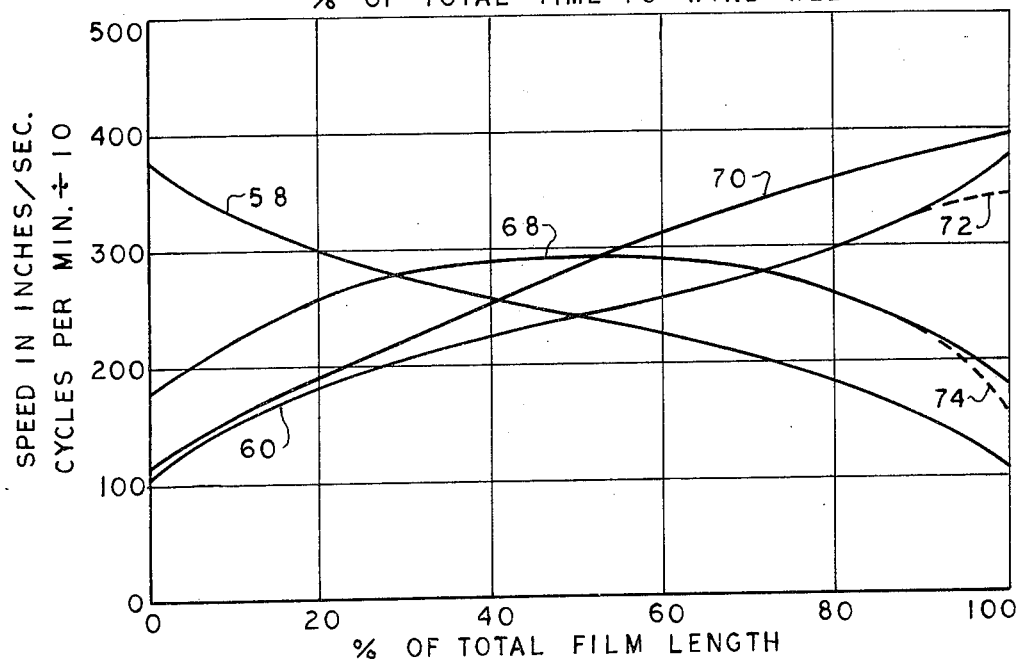

As shown in FIG. 3, the curves 60 and 68 both include dashed portions 72 and 74 respectively. The significance of the dashed portions 72 and 74 will be addressed hereinafter.

Figure 4:
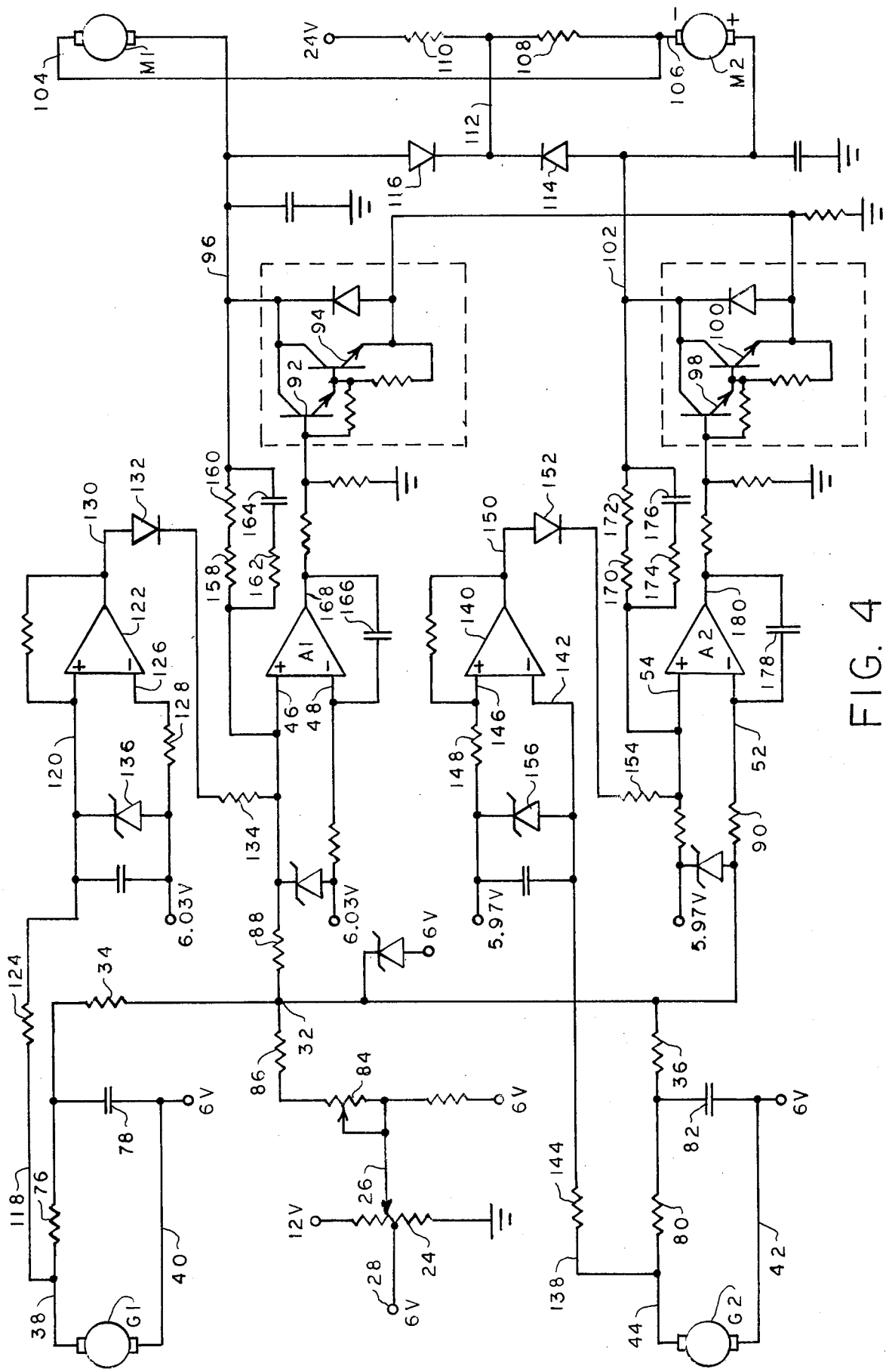
FIG. 4 is a more detailed circuit diagram of the system shown in FIG. 1, including further aspects of the invention not shown in FIG. 1.

A more complete circuit diagram of the apparatus shown in FIG. 1 is illustrated in FIG. 4 wherein the elements of FIG. 4 which correspond to similar elements of FIG. 1 are given like reference symbols. In the circuitry illustrated in FIG. 4, the voltage which corresponds to the voltage supply V of FIG. 1 is 12 volts. Accordingly, the reference voltage in the circuitry of FIG. 4 is 6 volts. Beginning at the left of FIG. 4, the generator G1 is shown as having a terminal 40 coupled to the 6 volt reference voltage and a terminal 38 coupled to the resistor 34 through another resistor 76. The connection between the resistors 34 and 76 is coupled to a capacitor 78, the other side of which is connected to the 6 volt supply. The combination of the resistor 76 and the capacitor 78 together operate as a noise filter for the generator G1.

The generator G2 is shown with its terminal 42 connected to the 6 volt reference voltage and its terminal 44 connected to the resistor 36 through another resistor 80. A capacitor 82 is coupled from the junction of the resistors 80 and 36 to the 6 volt reference voltage to act, in combination with the resistor 80, as a noise filter for the generator G1.

As in FIG. 1, the control voltage is developed on the wiper arm 26 of the resistor 24 which is coupled between a positive 12 volt supply and ground. The 6 volt reference voltage is taken at the terminal 28 which is coupled to the midpoint of the resistor 24. The wiper arm 26 is coupled to a variable resistor 84 and a fixed valve resistor 86 which together operate as the resistor 30 of FIG. 1. The resistor 84 is made variable in order to set the maximum sum of the speeds of rotation of the spools 10 and 12.

As shown, the resistors 86, 34 and 36 are coupled to the common connection 32 at which the motor drive signal is developed. The common connection 32 is coupled to the signal input terminal 46 of the amplifier A1 through a resistor 88 and is coupled to the input signal terminal 52 of the amplifier A2 via a resistor 90. The output of the amplifier A1 is coupled to a driver comprising transistors 92 and 94 and their associated circuitry for delivering via their output lead 96 a voltage of sufficient amplitude for driving the motor M1.

The output of the amplifier A2 is similarly amplified by a driver comprising the transistors 98 and 100 and their associated circuitry. The output of the transistors 98 and 100 is coupled via a lead 102 to the motor M2.

In order to limit their current through the motors M1 and M2 and to also limit their torque, the motors M1 and M2 are coupled from their terminals 104 and 106, respectively, to a pair of series coupled resistors 108 and 110, the resistor 110 being further coupled to a 24 volt power supply. The function of the resistors 108 and 110 is coupled via a lead 112 to a pair of diodes 114 and 116. The function of the diodes 114 and 116 is discussed hereinafter.

Referring again to the generator G1, its output terminal 38 is coupled via a lead 118 and a resistor 124 to a signal input terminal 120 of a comparator 122. The comparator 122 further includes a reference input terminal 126 coupled through a resistor 128 to a DC voltage indicated as 6.03 volt. The function of the comparator 122 is to generate at its output terminal 130 a small bias voltage which is coupled via a diode 132 and a resistor 134 to the signal input 46 of the amplifier A1. The comparator 122 is wired as a Schmitt trigger so that anytime the generator G1 develops at its output terminal 38 a voltage which is positive with respect to the reference voltage on the input terminal 126 of the comparator 122, the comparator 122 will impose a small bias voltage on the signal input lead 46 of the amplifier A1 to insure that the amplifier A1 turns on whenever it is to receive a signal from the generator G1 through the resistor 34. The additional voltage supplied by the comparator 122 is provided because the amplifier A1 may have an internal offset voltage which is large enough to keep the amplifier A1 off when the generator G1 is developing a small voltage which is positive with respect to the reference voltage.

Referring again to the comparator 122, it is shown as having a zener diode 136 coupled between its signal input lead 120 and the junction between the resistor 128 and the 6.03 reference voltage. The function of the zener diode 136 is to inhibit the voltage level at its signal input terminal 120 from rising substantially above the voltage level present on the reference input terminal 126. In the event that the generator G1 develops a substantially high output voltage, a portion thereof will flow through the resistor 124, through the zener diode 136, and then to the 6.03 reference voltage, thereby maintaining the voltage difference between the input leads 120 and 126 of the comparator 122 at a desired level.

Referring to the generator G2, its input is fed via a lead 138 and a resistor 144 to a signal input 142 of a comparator 140 which functions similary to the comparator 122. A reference voltage input terminal 146 is coupled to a 5.97 volt reference voltage through a resistor 148. In response to a voltage on its input terminal 142 being negative with respect to the reference voltage present on its terminal 146, the amplifier 140 provides a small bias voltage at its output terminal 150 which is coupled via a diode 152 and a resistor 154 to the input terminal 54 of the amplifier A2 to insure that the amplifier A2 conducts whenever the output of the generator G2 develops an output voltage of a polarity intended to turn the amplifier A2 on. The amplifier 140 also has a zener diode 156 coupled between its input terminal 142 and the 5.97 reference voltage to inhibit an excess voltage being developed across its input terminals 142 and 146.

The gain of the amplifier A1 is controlled by a pair of resistors 158 and 160 which are coupled between the input terminal 46 of the amplifier A1 and the collectors of the transistors 92 and 94. In parallel with the resistors 158 and 160 are a serially connected resistor 162 and a capacitor 164 which correct the phase shift of the system to maintain stability. The stability of the system is further controlled by a capacitor 166 coupled between the input terminal 48 of the amplifier A1 and its output terminal 168. The gain of the amplifier A2 is similarly controlled by a pair of resistors 170 and 172 coupled between the input terminal 54 of the amplifier A2 and the collectors of transistors 98 and 100. In parallel with the resistors 170 and 172 are a serially connected resistor 174 and a capacitor 176 which correct the phase shift of the system to maintain stability. The stability of the system is further controlled by a capacitor 178 coupled between the input terminal 52 of the amplifier A2 and its output terminal 180.

Returning now to a discussion of the diodes 114 and 116 which are coupled to the motors M1 and M2, these diodes, along with the resistor 108, function as a sensor which is responsive to the take-up spool having a high level of web and the supply spool having a low level of web for braking the system. This operation can be conveniently described if it is assumed that the motor M2 is deactivated and is coupled to the supply spool, while the motor M1 is driving the take-up spool. Assuming further that the motor M2 is being rotated by its spool at a high rate of speed, which, of course, occurs when the supply spool is nearly empty, the motor M2 will develop a back EMF (Electromotive force) of the polarity shown by the plus and minus signs adjacent the motor M2. Simultaneously, the motor M1 will be operating under a low torque condition and will, therefore, be drawing a low level of current. The current drawn by the motor M1 will flow from the 24 volt power supply through the resistors 110 and 108 and thence to the terminal 104 of the motor M1. Accordingly, the voltage across the resistor 108 is indicative of the torque associated with the motor M1. Because the diode 114 is coupled across the series combination of the motor M2 and the resistor 108, the diode 114 will be back biased and, therefore, off whenever the back EMF developed by the motor M2 is less than the voltage drop across the resistor 108. However, under the conditions described where the motor M1 is operating in a low torque condition and the motor M2 is rotating at a high speed, the current of the motor M1 through the resistor 108 will eventually be smaller than the back EMF developed by the motor M2. When a sufficient difference between these two voltages occurs, the diode 114 will be forward biased to permit current to flow through the motor M2 and thereby braking the system. The diode 116 functions in a manner similar to the diode 114 for supplying current through the motor M1 when the motor M2 is operating in a low torque situation and the motor M1 develops a sufficiently high back EMF. Such braking is particularly desirable when the end of the web is fixed to the supply spool. The braking thus provided will ensure that the spools come to a stop before the end of the web can be broken from the supply spool.

The consequence of the operation of the diodes 114, 116 and the resistor 108 is indicated in FIG. 3 by the dashed lines 72 and 74 which show how the speed of the supply spool decreases and the over-all speed of the transport of the web decreases when the diode associated with the supply spool motor conducts.

The control system described herein is useful in many applications where it is desired to transport a web between a pair of spools or reels. While the web is transported between the spools within the same transport time of conventional systems, the rate of transport of the web is more constant, thereby making it easier to stop the web at a desired location. The more nearly constant rate of transport of the web is particularly advantageous where the web is in the form of a microfilm having images which are being automatically read by a microfilm reader as the film is transported between spools.

Although the control system has been described in terms of a specific structural embodiment, many alterations and variations therein will be obvious to one skilled in the art. Accordingly, it is intended that all such alterations and variations be included within the spirit and scope of the invention as defined by the appended claims.

What is claimed is:

1. In a web transport system for advancing a web between first and second spools rotated, respectively, by first and second drive motors, a system for controlling the speed and direction of rotation of the spools, comprising:

means for generating a DC reference voltage;
means for generating a control voltage which is representative of the desired speed and direction of rotation of the first and second spools and which is a selectably variable DC voltage whose magnitude is variable between levels above and below the level of said reference voltage;
first and second servo generators for generating electrical outputs representative of the direction and speed of rotation of the first and second spools, respectively, said outputs being negative with respect to said reference voltage when the spools rotate in a first direction and positive with respect to said reference voltage when the spools rotate in a second opposite direction;
means for continuously and algebraically summing the control voltage with the outputs of said first and second speed sensing means, the summed signal constituting a motor drive signal;
a first comparator having a reference input receiving said reference voltage, a signal input receiving said motor drive signal, and an output coupled to said first drive motor;
a second comparator having a reference input receiving said reference voltage, a signal input receiving said motor drive signal, and an output coupled to said second drive motor;
said first comparator being responsive to said motor drive signal being positive with respect to said reference voltage for actuating said first drive motor for rotation in a first direction, and said second comparator being responsive to said motor drive signal being negative with respect to said reference voltage for actuating said second drive motor for rotation in a second, reverse direction, means coupled between said first servo generator and said first comparator and responsive to said first servo generator developing an output which is positive with respect to said reference voltage for applying a first bias voltage to the signal input of said first comparator, said bias voltage being of a magnitude sufficient to ensure that said first comparator actuates said first drive motor whenever the output of said first servo generator is positive with respect to said reference voltage; and means coupled between said second servo generator and said second comparator and responsive to said second servo generator developing an output which is negative with respect to said reference voltage for applying a second bias voltage to the reference input of said second comparator, said second bias voltage being of a magnitude sufficient to ensure that said second comparator actuates said second drive motor whenever the output of said second servo generator is negative with respect to said reference voltage, whereby said first and second bias voltages compensate for internal offset voltages in said first and second comparators, respectively, to ensure that said first drive motor is actuated whenever said first servo generator develops an output positive with respect to said reference voltage, and that said second drive motor is actuated whenever said second servo generator develops an output negative with respect to said reference voltage.

2. In a web transport system for advancing a web from a supply spool to a take-up spool and in which the spools are rotated, respectively, by first and second drive motors, a system for controlling the speed and direction of rotation of the spools, comprising:

first speed sensing means for generating an electrical output representative of the direction and speed of rotation of the supply spool;

second speed sensing means for generating an electrical output representative of the direction and speed of rotation of the take-up spool;

means for generating a control voltage representative of the desired speed and direction of rotation of the spools;

means for continuously and algebraically summing the control voltage with the outputs of said first and second speed sensing means, the summed signal constituting a motor drive signal;

a motor drive control for selectively applying the motor drive signal to the drive motor of the take-up spool, thereby rotating the supply spool by virtue of the pull exerted thereon by the web;

and a sensor responsive to the take-up spool having a high level of web and the supply spool having a low level of web for braking the system.

3. A system as set forth in claim 2 wherein the current through the motor which drives the take-up spool diminishes as the take-up spool becomes full of web, wherein the motor driving the supply spool develops an increasingly greater back electromotive force as its speed increases, and said sensor includes means for detecting a condition wherein both a low level of current flows through the motor which drives the take-up spool and a high back electromotive force is developed by the other motor.

4. A system as set forth in claim 3 wherein each drive motor has an input terminal connected to the output of said motor drive control and an output terminal, said sensor including a resistor connected to the output terminals of both motors for developing a voltage thereacross representative of the current through the motors, said sensor further including a first diode connected across the combination of said first drive motor and said resistor and a second diode connected across the combination of said second drive motor and said resistor, said diodes being poled such that when the back-electromotive force developed by one motor exceeds the voltage developed across said resistor in response to the current through the other drive motor, one of said diodes is forward biased for conducting current through the motor developing the back-electromotive force in order to brake the system.

* * * * *